Patented Oct. 11, 1938

2,132,527

UNITED STATES PATENT OFFICE 2,132,527

WATER-RESISTANT FABRIC

George V. Caesar, New York, N. Y., assignor to Stein, Hall & Company, Inc., New York, N. Y., a corporation of New York No Drawing. Original application February 3, 1936, Serial No. 62,137. Divided and this application September 25, 1936, Serial No. 102,538

7 Claims. (Cl. 91—68)

My invention relates to water-resistant amylaceous compositions of matter, and more particularly to a water-resistant amylaceous adhesive and its application to fabrics to produce therein a permanent water-resistant finish or size.

This application is a division of my copending patent application Serial No. 62,137, filed February 3, 1936. Its claims are directed to a water-resistant fabric and method of preparation. The claims in the parent application are directed to the water-resistant sizing composition and its method of manufacture.

Numerous attempts have been made in the past to produce a water-resistant starch composition, that is, one which, after drying, will not be readily redispersed in water. None of these prior attempts of which I am aware has proven commercially satisfactory, and I believe their failure has been due largely to lack of sufficient understanding of the nature of starch.

My invention is applicable to various amylaceous types of materials but for the purposes of explanation and without imposing any limitations upon its scope the invention will be described particularly with reference to its adaptation to starch or modified starch products. Acetylated starches have been found to be particularly satisfactory and starch degeneration products ranging from thin boiling starch to dextrine may also be used.

In order to understand the nature of my invention, it is necessary to understand the nature of starch. Starch may be visualized primarily as a long-chain hydroxylated compound, the links of which are composed of glucose anhydride units. The chains are associated with one another, through associative valence bonds into sheafs or micelles, the strength of this associative force being a function of the length or size of the chains. These micelles are packed together to form the granular organization seen microscopically, and constitute its building blocks. The initial effect of degeneration, through the early stages of thin-boiling or "soluble" starch and dextrine formation, is to shorten these chains through hydrolytic scission and hence to weaken their associative forces. A broken chain aggregate is more readily dispersed in water, i. e., it is more soluble. Solubility in this connection is a misnomer. There is no true solubility in a starch or a dextrine, only a varying degree of dispersibility in aqueous suspension. In order to render starch or starchy matter water-resistant upon drying, it is necessary to overcome this tendency of the starch to redisperse in aqueous suspension. In view of the fact that starch, as above suggested, is a hydroxylated compound, it is essentially hydrophilic or water-avid.

In accordance with my invention I have developed a process by means of which a partial or complete blocking of these starch hydroxyl groups with a chemical agent is utilized to produce a new composition in which the starch has lost its normal tendency to redisperse in water. In other words the composition is rendered water-resistant.

The chemical agents that I have found to be suitable for combining with the starch to produce this new water-resistant composition are in general the salts of the metals included in the sixth group of the periodic table, namely, salts of chromium, molybdenum, tungsten, and uranium. The salts that I have found to work more satisfactorily and to be of greatest practical value are certain chromic salts, particularly chromic halides and water soluble chromic salts of organic acids. Examples of these are chromic chloride, chromic fluoride, chromic bromide, chromic iodide, chromic acetate, chromic tartrate, and chromic potassium oxalate. The salts of the other metals above mentioned may be considered to be less important from the commercial standpoint since they are now rare and relatively expensive. The chromic salts are easily obtainable and are relatively inexpensive.

In addition to the selection of the chromic salts as the most practical group of chemicals suitable for my invention, I have also found that there are relatively great differences in the effectiveness of the respective chromic salts for producing the water-resistant composition of my invention. For example, the water soluble chromic salts of organic acids, e. g., chromic acetate, and the chromic halides, e. g., chromic fluoride, have been found to produce much more satisfactory results than some of the other chromic salts, particularly chromic sulphate, chrome alum, and chromic nitrate.

An object of my invention is to provide an amylaceous water-resistant adhesive composition that will not readily redisperse in water after it has once dried.

Another and more specific object of my invention is to provide an amylaceous water-resistant adhesive in which starch has been rendered water-resistant by coaction with a chromic salt.

A further object of my invention is to provide an adhesive coating composition suitable for forming a laundry-resistant finish on fabrics and similar related materials utilizing the coaction product of starch and a chromic compound as the principal water-resisting agent.

The compositions of my invention have an adhesive characteristic and are commercially useful for textile sizing or finishing to provide a water-resistant textile having improved body, hand, dimensional stability, weight, etc., and furthermore useful for all of the general applications of adhesives to paper, leather, wood, etc.

The coaction between the amylaceous material and the chemical agent, which I believe takes place during the process of formation of my adhesive composition, may be described easily with reference to starch and the following description is given for this purpose but only by way of example without in any manner limiting the scope of my invention.

Starch being a long-chain hydroxylated compound the links of which are composed of glucose anhydride units, led me to the belief that the chemical agent which I react with the starch to produce the water-resistant composition should be capable of being converted into a complex hydroxo-aquo compound of a type sufficiently similar to starch to have a natural affinity for associating or combining with the starch. I have found that the well known complex aggregates formed by chromic salts in water solution may develop suitable characteristics for combining with starches and modified starches to form, under suitable subsequent treatment, a water-resistant product. To explain the formation of these chromic complexes, one of the well known theories involves processes of hydrolysis termed "olation", and "oxolation". In order to illustrate, by way of example, this theory, I give below several structural formulae illustrating the ionic reactions which hydrated chromic chloride may undergo under favorable conditions and which served as a guide in my invention. These ionic reactions are cited as illustrative and not by way of limitation.

Assuming hydrated chromic chloride as a preferable salt, its positive ion, i. e., cation, may be expressed as:

*Pentaaquomonochloride ion*

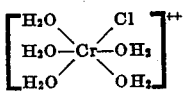

Favored by heating, concentration, and basicity, and affected by the nature of the anions bound in the nucleus, a process of hydrolysis leading to olation and oxolation may take place, according to the following ionic reactions, expressed in their simplest form:

*Initial stage of hydrolysis*

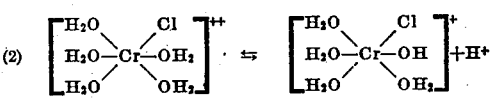

*Olation or simplest polymerization*

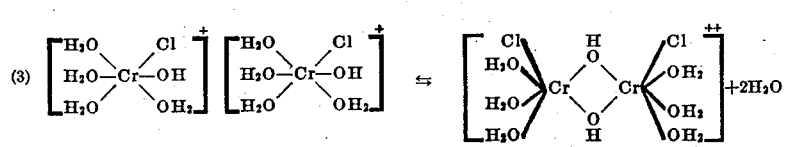

In the above polymerization hydroxyl ions penetrate the internal sphere and replace water molecules or aquo groups.

Lastly, the following may occur:

*Oxolation*

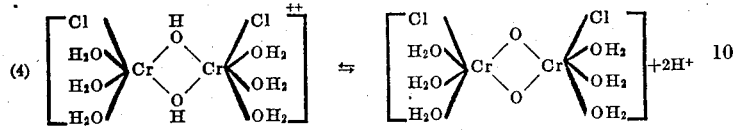

Ionic reaction No. (3) records the simplest polymerization through dissociation of aquo groups to hydroxo groups. The reactions may be considerably more complex, and prior investigators have suggested the possibility of the existence, under favorable conditions, of such complexes as dodecaoldodecaaquohexachromi chloride. The oxolated compound shown in ionic reaction No. (4) represents the most stable and irreversible combination of the lot.

Although I believe that the above ionic reactions illustrate the changes which chromic salts undergo to become effective agents for coaction with amylaceous materials, such as starch, to produce the water-resistant composition of my invention, I do not wish to limit my invention to this or any other theoretic explanation.

The general characteristics possessed by the chromic salts which I have found to give preferred results are as follows:

1. The salt is soluble in water;
2. The salt does not impair the working properties of the starch paste, e. g., its consistency and adhesiveness;
3. The salt tends to form aggregates of large size, that is to polymerize upon drying.

If the salt possesses these characteristics, it should possess sufficient associative valence forces necessary to obtain a binding union with the starch aggregate.

The composition of my invention contains principally an amylaceous material, such as for example, starch or a starch degeneration product, e. g., thin boiling starch, and a relatively small percentage of the coacting salt, e. g., chromic acetate, together with a sufficient amount of water to form a liquid paste. In this mixture the starch is probably not dissolved but is rather dispersed in the liquid medium. This composition may be applied to any of the various materials upon which adhesives and coating compositions are normally used. As an example of one commercial use of this composition, I describe below its adaptation to provide a permanent water-resistant finish on textile materials. This example is illustrative only and is not to be interpreted as limiting the invention thereto.

*Example*

The adhesive coating composition to be used upon textiles is prepared by heating starch in water to form a dispersion and adding 5 to 10%, by weight of the dry starch, of chromic acetate.

The proportions are such that the composition has a consistency similar to that of the ordinary liquid adhesive paste. The goods to be finished are passed through this paste by means of a series of rollers such as a quetch. After the composition is applied, the goods may be partially dried and then passed through an alkaline solution, such as for example, ammonia, soda ash or sodium hydroxide. After this alkaline treatment, the goods are thoroughly dried and will be found to be extremely resistant to the normal soaking and washing processes and, if sufficiently sized, without any appreciable shrinking or other dimensional changes. The thus treated goods have no apparent surface coating but show a decided improvement over the untreated goods with regard to body, hand, dimensional stability, weight, etc.

The practice of the invention is not limited to the proportions given in the above example. Less than 5% of the chromic salt may be used where light colors are desired and more than 10% may be used where greater water resistance is desired. It is preferable not to use more salt than will be soluble in the starch size. A convenient amount of alkali solution to be used is 5% but this amount may be varied widely. Sufficient alkali should be used to render the size, which is finally contained in the goods, alkaline in reaction.

The heat used for preparing the starch-chromic acetate mixture and also the heat generally used for drying the treated goods will concentrate the chromic salt and cause it to undergo a change which may be due to olation and oxolation, thereby promoting combination with the starch to produce the water-resistant compound.

The treatment of the goods, previously coated with the starch and chromic salt mixture, with the alkaline solution effects a more thorough hardening of the starch and chromic salt compound upon the fibres of the goods in accordance with the theoretically optimum conditions previously described. This alkaline treatment may be omitted. However, it is found beneficial for increasing the water-resistant properties of the coating. The alkali has a jelling effect upon the starch and chromic salt compound. I have found from practical experience that if the alkali is added to the starch-chromic salt solution before the latter is applied to the goods to be treated that the composition will form a thick jelly-like mass which is difficult to handle and which renders the process unattractive commercially. However, if the alkaline solution is used after the cloth has been treated with the starch-chromic salt solution in the manner described above, these undesirable effects are avoided and the efficiency of the composition as a water-resistant coating is greatly increased.

Partial drying prior to alkaline treatment may also be omitted, but this preliminary drying appears to assist in fixing the size upon the fabric.

It is to be understood that the specific illustrations and examples given herein are not intended to limit the scope of my invention since various substitutions and changes may be made in the amylaceous materials and in the chromic salts or other salts used. Also, it will be understood that when the composition is to be used for treating wood, leather, etc., that the proportions of the several ingredients used for sizing textiles, supra, will be appropriately changed to give the composition the proper consistency, adhesiveness and other physical properties.

The word "finish" as used in the specification and claims denotes those characteristics of the treated material that are well known to the textile trade, e. g., stiffness, body, weight, hand, etc. The word "permanent" as used herein denotes the type of finish produced by my water-resistant or substantially non-redispersible type of composition. For example, the permanent finish produced on and in the fabrics treated with the composition of this invention is not removed by mild laundering and is difficultly removable by severe long washings with soap and water heated to 180° F. and above. In other words, the finish is permanent or non-removable by washings which would easily remove the ordinary sizes or finishes.

The term "dimensional stability" used hereinabove denotes the property or ability of my sized fabrics to resist shrinkage or other dimensional changes when subjected to ordinary laundering or somewhat more stringent washing tests. I have found by various washing tests made on suitable fabrics, using soap solutions at elevated temperatures that a sufficient amount of my water resistant sizing composition remains in and on the fabric during and subsequent to the washing to prevent the water and soap from attaching the individual fibers of the fabric, whereby shrinking or stretching of the fabric is avoided.

My fabrics distinguish from fabrics treated with water-repellent materials, such as metallic soaps, in that the water resistant size in my fabric is of an adhesive nature and is not removed by the abrasion ordinarily encountered in washing the fabric, whereas the water insoluble soaps, although inherently highly water repellent, are removable from the fabric by the abrasive effects of ordinary washing.

It becomes apparent, therefore, since the water resistant size used in the fabrics of my invention is not appreciably removable by ordinary washing, that the fabric if sufficiently sized is protected from shrinking or other dimensional changes which normally take place when either untreated fabrics or fabrics treated with waterproof materials which are removable by slight abrasion are washed. If the washing of my fabric is carried on for an abnormally long time and excessively strong hot soap solutions are used, it is to be expected that the water resistant size in the fabric would be removed. However, for all practical purposes, including normal use and laundering proper to the fabric, it remains water-resistant, stable against dimensional changes if sufficiently sized, and possesses the improved body, hand, weight, etc. mentioned above.

As one illustrative embodiment of my invention, the inexpensive cotton cloth known as 40/60, when sized with my water resistant adhesive composition, is rendered greatly superior to the untreated cloth in several respects, such as the following:

It has an appreciable increase in weight, body, and hand, rendering it more durable and serviceable and giving it in form more of the appearance of the better grade, expensive fabrics. Because of the water resistant properties of this fabric it can be suitably laundered a number of times without losing its body and desired stiffness. Accordingly, the goods made of this cloth will not lose their shape and will not shrink when suitably laundered.

The fabric of my present invention, by virtue of the new association of my water-resistant adhesive composition with a fabric to produce a new and superior product, constitutes a new article of manufacture.

Various modifications and changes in the composition, fabrics treated with this composition, and the method of so treating will become apparent to those skilled in this art. The appended claims are intended to cover my invention in a number of its possible forms.

I claim:

1. As a new article of manufacture, a water-resistant and increased dimensionally stable fabric comprising fabric material impregnated with a water-resistant adhesive composition containing the coaction product of an amylaceous material and chromic acetate.

2. A process for producing a water-resistant starch finish upon cloth comprising passing the cloth through a liquid paste containing starch and approximately 5 to 10% of chromic acetate in aqueous suspension, partially drying the treated cloth, passing the partially dried cloth through an alkaline solution and then thoroughly drying the cloth.

3. As a new article of manufacture, a water-resistant and increased dimensionally stable fabric having relatively great body, hand and weight comprising fabric material impregnated with a water-resistant adhesive composition containing the coaction product of an amylaceous material and a water soluble chromic tartrate.

4. As a new article of manufacture, a water-resistant and increased dimensionally stable fabric having relatively great body, hand and weight comprising fabric material impregnated with a water-resistant adhesive composition containing the coaction product of an amylaceous material and a water soluble chromic potassium oxalate.

5. As a new article of manufacture, a water-resistant and increased dimensionally stable fabric having relatively great body, hand and weight comprising fabric material impregnated with a water-resistant adhesive composition containing the coaction product of an amylaceous material and a chromic salt selected from the group consisting of chromic acetate, chromic tartrate, and chromic potassium oxalate.

6. A process for preparing a water-resistant and increased dimensionally stable fabric comprising passing the fabric material through a liquid composition containing an amylaceous material and a chromic salt selected from the group consisting of chromic acetate, chromic tartrate, and chromic potassium oxalate, partially drying the thus treated material, passing the partially dried material through an alkaline solution and then drying the material.

7. A process for forming a permanent finish on cloth comprising passing the cloth through a suspension of an amylaceous material and a water soluble chromic salt selected from the group consisting of chromic acetate, chromic tartrate, and chromic potassium oxalate, and then drying the cloth.

GEORGE V. CAESAR.